(12) United States Patent
Zhang et al.

(10) Patent No.: US 9,699,074 B2
(45) Date of Patent: Jul. 4, 2017

(54) EFFICIENT UTILIZATION OF TRANSCEIVERS FOR SHARED RESTORATION IN FLEXIBLE GRID OPTICAL NETWORKS

(71) Applicant: Fujitsu Limited, Kawasaki-shi, Kanagawa (JP)

(72) Inventors: Qiong Zhang, Plano, TX (US); Xi Wang, Murphy, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 14/621,066

(22) Filed: Feb. 12, 2015

(65) Prior Publication Data

US 2015/0295673 A1 Oct. 15, 2015

Related U.S. Application Data

(60) Provisional application No. 61/978,030, filed on Apr. 10, 2014.

(51) Int. Cl.
*H04J 14/02* (2006.01)
*H04L 12/703* (2013.01)
(Continued)

(52) U.S. Cl.
CPC ............ *H04L 45/28* (2013.01); *H04J 14/021* (2013.01); *H04J 14/0295* (2013.01); *H04L 41/145* (2013.01); *H04L 45/22* (2013.01); *H04L 45/62* (2013.01); *H04Q 11/0066* (2013.01); *H04L 41/0668* (2013.01); *H04Q 2011/0016* (2013.01); *H04Q 2011/0081* (2013.01); *H04Q 2011/0086* (2013.01)

(58) Field of Classification Search
None
See application file for complete search history.

(56) References Cited

U.S. PATENT DOCUMENTS 6,657,952 B1 * 12/2003 Shiragaki ............ H04J 14/0212
370/223
2002/0145779 A1 * 10/2002 Strasser ............. G02B 6/29367
398/69

(Continued)

OTHER PUBLICATIONS

Cugini et al; Reliable Flexible-ROADM Architecture enabling Modulation Format Adaption; ;2012, Optical society of America; pp. 1-3.*

(Continued)

*Primary Examiner* — Ken N Vanderpuye
*Assistant Examiner* — Amritbir Sandhu
(74) *Attorney, Agent, or Firm* — Baker Botts L.L.P.

(57) ABSTRACT

Optical transceiver sharing methods may be based on different ROADM node architectures for shared restoration in flexible grid optical networks. A ROADM node architecture with a pool of transceivers may improve transceiver utilization for backup optical paths, compared to a conventional ROADM node architecture. Sharing of transceivers in the pool for working and backup optical paths may further improve transceiver utilization. The methods disclosed herein may be used for multiple bit rates and different modulation formats.

16 Claims, 9 Drawing Sheets

(51) Int. Cl.
*H04L 12/707* (2013.01)
*H04Q 11/00* (2006.01)
*H04L 12/721* (2013.01)
*H04L 12/24* (2006.01)

(56) References Cited

U.S. PATENT DOCUMENTS

| | | | | |
|---|---|---|---|---|
| 2004/0190901 A1* | 9/2004 | Fang | ............... | G02B 6/2931 398/59 |
| 2005/0185954 A1* | 8/2005 | Sadananda | ........... | H04B 10/032 398/5 |
| 2008/0131130 A1* | 6/2008 | Chang | ............... | H04J 14/0212 398/83 |
| 2009/0028561 A1* | 1/2009 | Zhang | ............... | H04J 3/14 398/45 |
| 2009/0046572 A1* | 2/2009 | Leung | ............... | H04J 14/0227 370/216 |
| 2009/0060504 A1* | 3/2009 | Chang | ............... | H04J 14/029 398/48 |
| 2011/0126041 A1* | 5/2011 | Matsubara | ............... | H04L 45/22 714/4.11 |
| 2012/0307644 A1* | 12/2012 | Gandhi | ............... | H04L 41/0893 370/241 |
| 2013/0223225 A1* | 8/2013 | Hui | ............... | H04L 41/0836 370/236 |
| 2013/0336658 A1* | 12/2013 | Xia | ............... | H04J 14/0204 398/83 |
| 2014/0147107 A1* | 5/2014 | Swinkels | ............... | H04L 45/24 398/9 |
| 2014/0207967 A1* | 7/2014 | Bryskin | ............... | H04L 45/02 709/243 |
| 2014/0226985 A1* | 8/2014 | Patel | ............... | H04J 14/021 398/79 |
| 2014/0317257 A1* | 10/2014 | Zhang | ............... | H04L 45/64 709/223 |
| 2014/0355981 A1* | 12/2014 | Miyazaki | ............... | H04J 14/021 398/38 |
| 2015/0016242 A1* | 1/2015 | Ernstrom | ............... | H04L 45/122 370/218 |
| 2015/0046592 A1* | 2/2015 | Patel | ............... | H04L 67/1036 709/226 |
| 2015/0055945 A1* | 2/2015 | Wellbrock | ........... | H04B 10/032 398/2 |
| 2015/0103671 A1* | 4/2015 | Ernstrom | ............... | H04L 41/0659 370/238 |
| 2015/0244470 A1* | 8/2015 | Chhillar | ............... | H04B 10/70 398/5 |
| 2015/0271056 A1* | 9/2015 | Chunduri | ............... | H04L 45/02 370/238 |
| 2015/0295673 A1* | 10/2015 | Zhang | ............... | H04L 45/22 398/5 |
| 2016/0028615 A1* | 1/2016 | Lee | ............... | H04L 47/122 370/237 |
| 2016/0065461 A1* | 3/2016 | Zhang | ............... | H04L 45/64 709/223 |
| 2016/0373206 A1* | 12/2016 | Tanimura | ............... | H04J 14/0202 |

OTHER PUBLICATIONS

Eira, A., et al., "Optimized Design of Shared Restoration in Flexible-Grid Transparent Optical Networks," OFC/NFOEC Technical Digest © 2012 OSA, 3 pages.

Aoki, Y., et al., "Dynamic and Flexible Photonic Node Architecture with Shared Universal Transceivers Supporting Hitless Defragmentation," ECOC Technical Digest, We.3.D.2., © 2012 OSA, 3 pages.

Zhang, Q., et al., "On Efficient Utilization of Transceivers for Shared Restoration in Flexible Grid Optical Networks," ECOC, Cannes, Franc, 2012, 3 pages, 2014.

* cited by examiner

EFFICIENT UTILIZATION OF TRANSCEIVERS FOR SHARED RESTORATION IN FLEXIBLE GRID OPTICAL NETWORKS

CROSS-REFERENCE TO RELATED APPLICATIONS

This application claims priority from U.S. Provisional Application No. 61/978,030 filed Apr. 10, 2014, entitled "EFFICIENT UTILIZATION OF TRANSCEIVERS FOR SHARED RESTORATION IN FLEXIBLE GRID OPTICAL NETWORKS".

BACKGROUND

Field of the Disclosure

The present disclosure relates generally to flexible grid optical networks and, more particularly, to efficient utilization of transceivers for shared restoration in flexible grid optical networks.

Description of the Related Art

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal is conveyed by modulating the phase of a reference signal, also known as a carrier wave. The information may be conveyed by modulating the phase of the signal itself using differential phase-shift keying (DPSK). In QAM, the information carried by the optical signal is conveyed by modulating both the amplitude and phase of the carrier wave. PSK may be considered a subset of QAM, where the amplitude of the carrier waves are maintained as a constant.

Emerging network applications, such as cloud and big data, may involve joint consideration of information technology (IT) resources residing at data centers and network resources interconnecting data centers. As more applications move to the cloud the bandwidth of inter-data center connections increases, such as to 400 Gb/s and beyond. With the help of software defined networking (SDN) technology, inter-data center connections may be dynamically provisioned and may perform both bandwidth adjustment to match application demand variations, as well as restoration of network links in case of failures.

SUMMARY

In one aspect, a disclosed method for efficient utilization of transceivers in optical networks includes determining, for a reconfigurable optical add-drop multiplexer (ROADM) node in an optical network, a plurality of backup optical paths respectively corresponding to a plurality of working optical paths, including determining a respective spectrum assignment for each of the backup optical paths and for each of the working optical paths. In the method, the backup optical paths and the working optical paths may represent respective pairs of working-backup optical paths having a first end point at the ROADM node. In the method, each pair of the working-backup optical paths has a second end point at a common node in the optical network. In the method, a spectrum assignment for an optical path may specify a data bandwidth and a modulation format for the optical path. The method may include determining, for the ROADM node, a minimum number of optical transceivers to enable the backup optical paths in the optical network based on a predetermined set of risks of optical path failure. In the method, at least some of the optical transceivers may be shared among the backup optical paths.

In any of the disclosed embodiments of the method, the optical transceivers may be enabled to transmit and receive a superchannel. In any of the disclosed embodiments of the method, at least some of the pairs of working-backup optical paths may have different spectrum assignments for a working optical path and a backup optical path included in a pair of working-backup optical paths.

In any of the disclosed embodiments of the method, the optical transceivers may be included in dedicated transponders at the ROADM node. In the method, a dedicated transponder may include at least two optical transceivers that operate with a spectrum assignment that is predetermined. In the method, the ROADM node may include a switch for protection switching between a pair of working-backup optical paths. In the method, determining the minimum number of optical transceivers may include determining a minimum number of dedicated transponders at the ROADM node.

In any of the disclosed embodiments of the method, the optical transceivers may be included in a transceiver pool at the ROADM node. In the method, each of the optical transceivers is a universal transceiver may be enabled to support different spectrum assignments. In the method, the ROADM node may include a cross-connect switch to enable selection of a first optical transceiver for one of a working optical path and a backup optical path.

In any of the disclosed embodiments of the method, the optical transceivers associated with the working optical paths are not used for the backup optical paths.

In any of the disclosed embodiments of the method, at least some of the optical transceivers associated with the working optical paths are used for the backup optical paths.

Additional disclosed aspects for efficient utilization of transceivers in optical networks include an article of manufacture comprising a non-transitory, computer-readable medium, and computer executable instructions stored on the computer-readable medium. A further aspect includes a management system comprising a memory, a processor coupled to the memory, and computer executable instructions stored on the memory.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
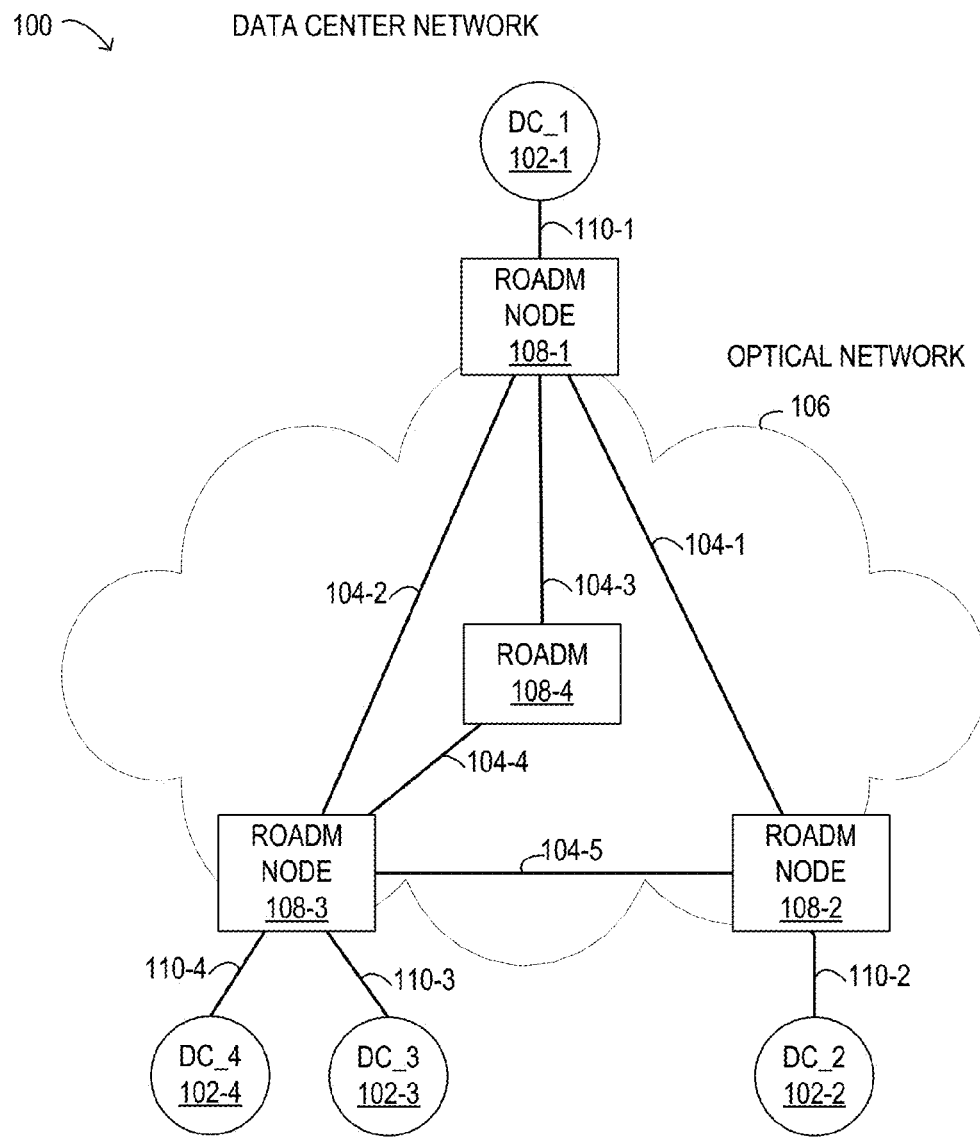
FIG. 1 is a block diagram of selected elements of an embodiment of a data center network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADM) and with conventional implementations of demultiplexers. However, as data rates increase to 400 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, optical networks may employ components compatible with flexible grid optical networking that enables specifying a particular frequency slot per channel. For example, each wavelength channel of a wavelength division multiplexing (WDM) transmission may be allocated using at least one frequency slot. For example, one frequency slot may be assigned to a wavelength channel whose symbol rate is low, while a plurality of frequency slots may be assigned to a wavelength channel whose symbol rate is high. Thus, in certain instances a reconfigurable OADM (ROADM) may be used that is capable of adding or dropping individual or multiple wavelengths of a WDM signal carrying data channels to be added or dropped in the optical domain, for example, using a wavelength selective switch (WSS).

Additionally, to improve spectral transmission efficiency, optical channels may be implemented in a superchannel that includes subcarriers (channels) that are tightly packed in the spectrum. Superchannels represent an advancement in dense WDM (DWDM). A superchannel is routed as a single entity in an optical network, for example, using a ROADM.

Turning now to the drawings, FIG. 1 illustrates an example embodiment of data center network 100. In FIG. 1, data center network 100 may include optical network 106, data center nodes 102, ROADM nodes 108, and optical paths 104. As shown, data center network 100 is an example embodiment for descriptive purposes and may represent various types and configurations of network topologies that comprise connections of optical paths 104 between data center nodes 102, where a bandwidth of optical paths 104 may be adjustable, for example using different transceivers at ROADM nodes 108. In data center network 100, ROADM nodes 108 comprising optical network 106 may include colorless, directionless, contentionless, gridless (CDCG) reconfigurable optical add-drop multiplexer (ROADM) nodes that interconnect data center nodes 108. In various embodiments, optical network 106 may be a flexible grid optical network, as described above.

Specifically, as shown in FIG. 1, data center network 100 includes ROADM node 108-1 which connects data center node 102-1 to optical network 106 via connection 110-1. Data center network 100 also includes ROADM node 108-2 which connects data center node 102-2 to optical network 106 via connection 110-2. Data center network 100 also includes ROADM node 108-3 which connects data center node 102-3 to optical network 106 via connection 110-3, and data center node 102-4 via connection 110-4. Data center network 100 also includes ROADM node 108-4, which is an interior node in optical network 106. In optical network 106, optical path 104-1 connects ROADM nodes 108-1 and 108-2, optical path 104-2 connects ROADM nodes 108-1 and 108-3, optical path 104-3 connects ROADM nodes 108-1 and 108-4, optical path 104-4 connects ROADM nodes 108-4 and 108-3, and optical path 104-5 connects ROADM nodes 108-2 and 108-3. Although data center network 100 in FIG. 1 is not drawn to scale and is a schematic representation, it may be assumed that distances of optical paths 104 between individual ROADM nodes 108 vary significantly.

During provisioning of connections between data center nodes 102, referred to as an inter-data center connection request, optical paths are provisioned for a desired spectrum assignment, including bit rate (or data bandwidth) and a modulation format. In the following description, each inter-DC connection may be assumed to be a superchannel generated using transceivers at ROADM nodes 108. ROADM nodes 108 may include distance-adaptive modulation capability, such as a capability to select a desired modulation format for a given optical path. The desired modulation format may be selected by choosing a dedicated transponder for the desired modulation format, or by configuring a universal transceiver to employ the desired modulation format, as will be explained in further detail. Based on the bit rate and physical distance of the optical path specified in a connection request, an appropriate modulation format (to achieve higher spectral efficiency) and a number of associated transceivers may be provisioned.

In data center network 100, restoration may be performed in flexible grid optical network 106 using CDCG-ROADM nodes 108. An incoming request for network provisioning between data center node 102-1 and data center node 102-2, for example from a customer of an operator of optical network 106, may result in a working optical path and a backup optical path being provisioned. In one embodiment, the working optical path may be optical path 104-1, while the backup optical path may include optical paths 104-2 and 104-5. The working optical path and the backup optical path may be referred to as a working-backup optical path pair, having common end nodes at ROADM nodes 108-1 and 108-2. When a physical distance of a backup optical path is different than that of an associated working optical path, the modulation format and the number of transceivers assigned for the backup optical path may be different from the working optical path. The difference in the number of transceivers between the working optical path and the backup optical path, as well as differences among backup optical paths of other connection requests, may result in inefficient transceiver sharing in case of network failures. Therefore, efficient methods for shared restoration in flexible grid optical networks is desirable, since the number of transceivers may substantially contribute to a cost associated with the optical network 106.

Accordingly, the inventors of the present disclosure have discovered methods for efficient utilization of transceivers at ROADM nodes for shared restoration in flexible grid optical networks. The method disclosed herein may minimize a total number of transceivers used for backup optical paths. The methods disclosed herein may provide economic benefits of transceiver sharing by using dedicated transponders or a flexible ROADM architecture with a pool of transceivers.

Figure 2A:
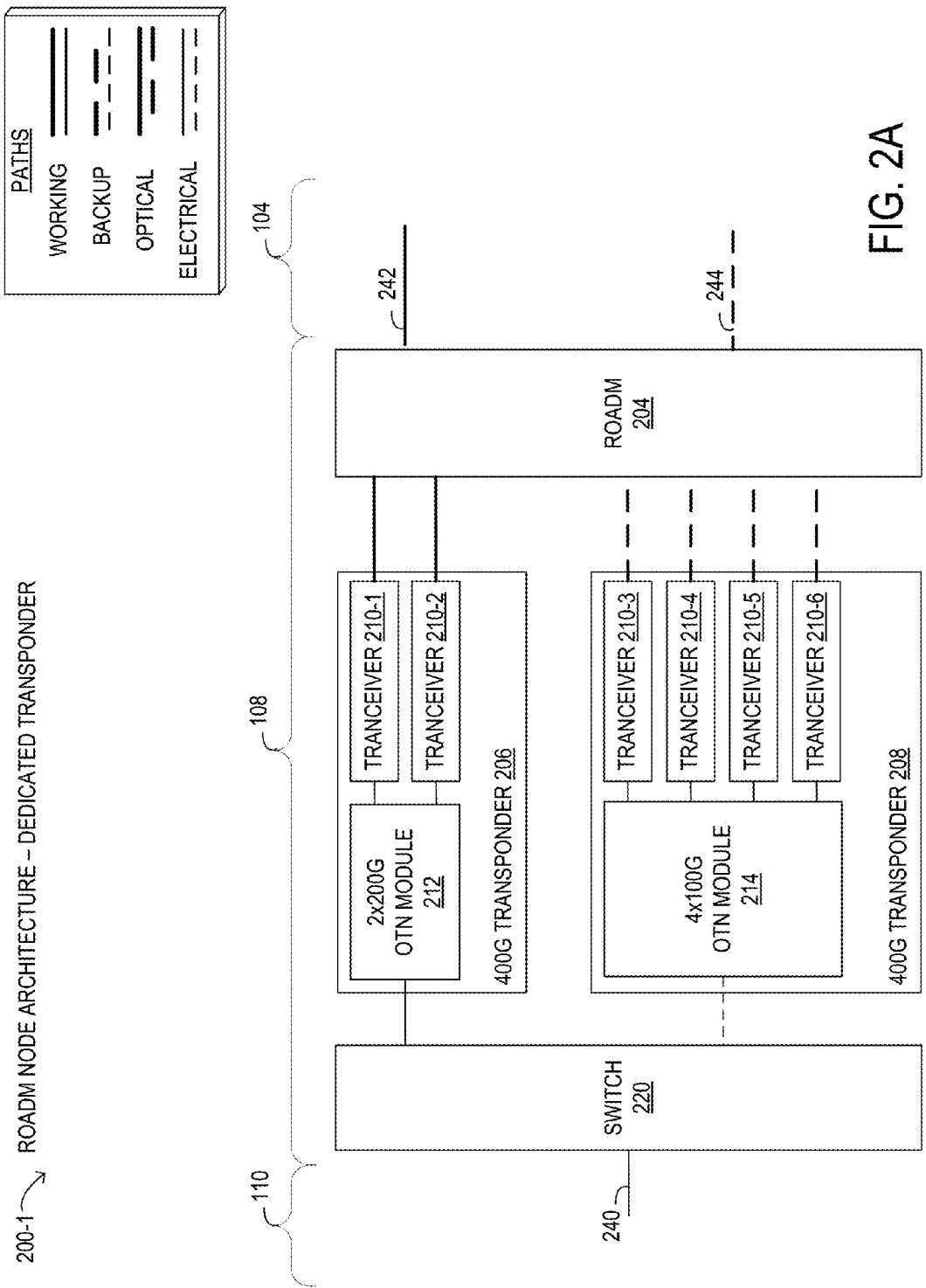
FIG. 2A is a block diagram of selected elements of an embodiment of a ROADM node architecture.

In FIG. 2A, ROADM node architecture 200-1 includes working optical path 242 and backup optical path 244, which represent optical paths 104 in FIG. 1. ROADM node architecture 200-1 further includes an embodiment of ROADM node 108, and service path 240, representing connection 110 in FIG. 1 to data center node 102.

As shown in FIG. 2A, ROADM node 108 includes 2 types of dedicated transponders: 400G transponder 206 using two transceivers and employing dual polarization 16QAM (DP-16QAM) modulation format, and 400G transponder 208 using four transceivers employing DP-QPSK modulation format. 400G transponder 206 and 400G transponder 208 may operate bidirectionally to convert between optical and electrical paths in both directions simultaneously. As shown, 400G transponder 206 includes OTN module 212 for processing 2×200G electrical signals corresponding to optical signals at transceivers 210-1 and 210-2, while 400G transponder 206 includes OTN module 214 for processing 4×100G electrical signals corresponding to optical signals at transceivers 210-3, 210-4, 210-5 and 210-6. Transceivers 210 may be referred to as dedicated transceivers operating with a fixed data bandwidth and modulation format of a respective transponder. It is noted that in different embodiments, an appropriate transponder type may be installed in ROADM node 108 to match a modulation format or a reach associated with a particular connection request.

Also included in ROADM node architecture 200-1 is switch 220, which may be used to switch transponders for restoration, also referred to as protection switching, to backup optical path 244 when working optical path 242 fails or is rendered inoperable. In ROADM node architecture 200-1, protection switching is performed internally using switch 220 such that data center 102 is provided with service path 240 at connection 110 by ROADM node 108. An operational example of transceiver sharing using the dedicated transponders in ROADM node architecture 200-1 is described in further detail below with respect to FIG. 3A.

Figure 2B:
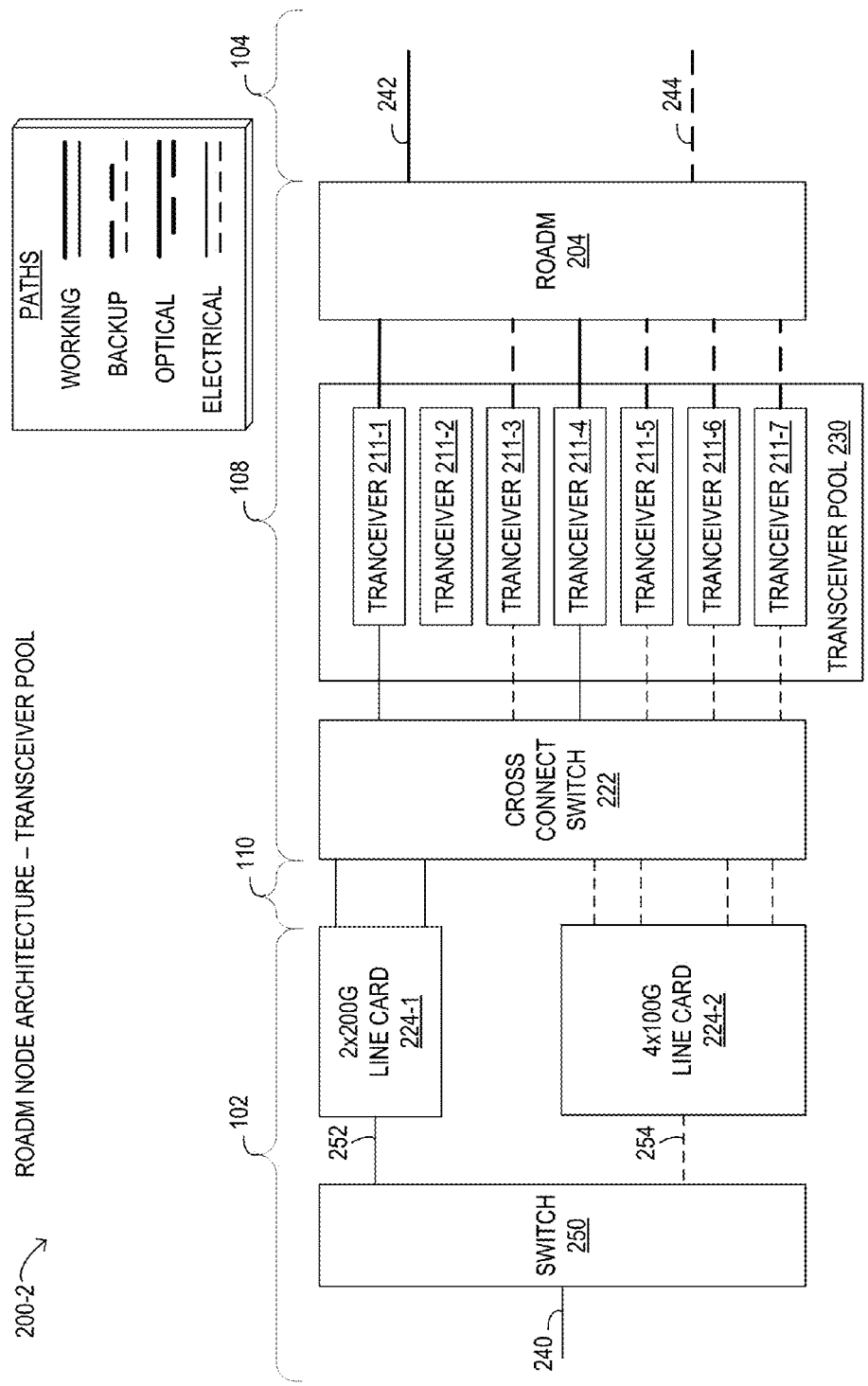
FIG. 2B is a block diagram of selected elements of an embodiment of a ROADM node architecture.

In FIG. 2B, ROADM node architecture 200-2 includes working optical path 242 and backup optical path 244, which represent optical paths 104 in FIG. 1. ROADM node architecture 200-2 further includes an embodiment of ROADM node 108, connection 110, and certain elements of data center node 102 in FIG. 1.

As shown in FIG. 2B, ROADM node 108 includes transceiver pool 230 that includes transceivers 211. Although 7 transceivers (211-1, 211-2, 211-3, 211-4, 211-5, 211-6, 211-7) are shown in ROADM node architecture 200-2 for descriptive clarity, it will be understood that transceiver pool 230 may be operated with different numbers of transceivers 211. In certain embodiments, transceivers 211 may be universal transceivers capable of handling different types of optical modulation formats. Transceivers 211 may be shared among (or assigned to) different optical paths in ROADM node 108. The flexible utilization of transceivers 211 is enabled by using cross connect switch 222 (also referred to as a matrix switch) which outputs, via connection 110, electrical signal paths to corresponding line cards 224 at data center node 102. For example, as shown, working optical path 242 is output as 2×200G optical channels to respective transceivers 211-1 and 211-4 by ROADM 204. Then, cross-connect switch 222 routes 2×200G electrical signals from transceivers 211-1 and 211-4 via connection 110 to 2×200G line card 224-1 at data center node 102. At data center node 102, 2×200G line card 224-2 outputs 400G electrical signal to switch 250 as a working electrical path that is linked to working optical path 242. Also, as shown, backup optical path 244 is output as 4×100G optical channels to respective transceivers 211-3, 211-5, 211-6, and 211-7 by ROADM 204. Then, cross-connect switch 222 routes 4×100G electrical signals from transceivers 211-3, 211-5, 211-6, and 211-7 via connection 110 to 4×100G line card 224-2 at data center node 102. At data center node 102, 4×100G line card 224-2 outputs 400G electrical signal to switch 250 as a backup electrical path that is linked to backup optical path 244. At data center node 102, switch 250 may accordingly perform protection switching between working optical path 242 and backup optical path 244.

Thus, in ROADM node architecture 200-2, protection switching is performed at data center node 102 using switch 250, to switch from working optical path 242 to backup optical path 244. Using transceiver pool 230, ROADM node architecture 200-2 may enable flexible selection of transceivers 211 to match a modulation format or a reach associated with a particular connection request. Two operational examples of transceiver sharing using transceiver pool 230 in ROADM node architecture 200-2 are described in further detail below with respect to FIGS. 3A and 3B.

Figure 3A:
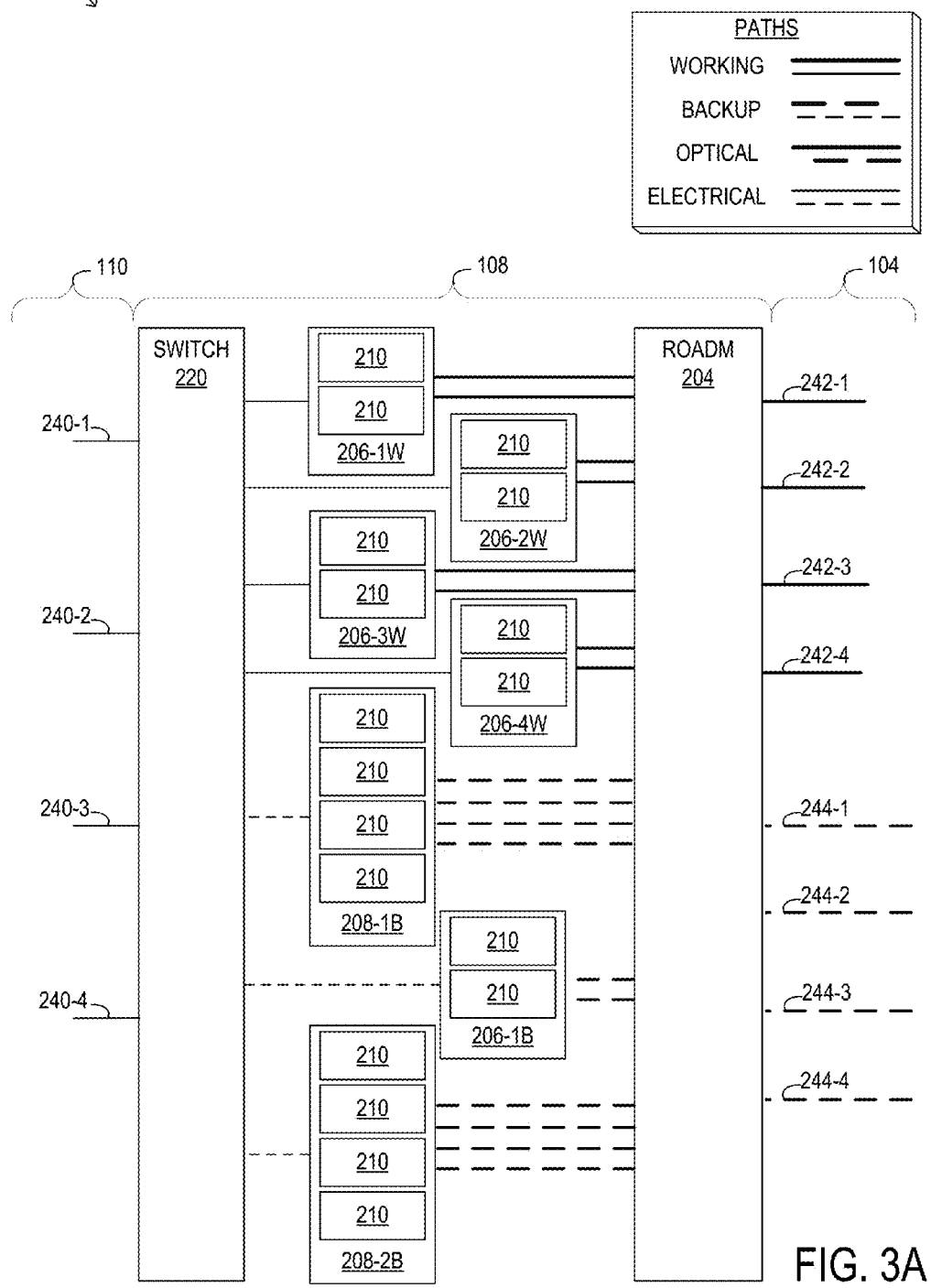
FIG. 3A is a block diagram of selected elements of an embodiment of transceiver sharing using dedicated transponders.
Figure 3B:
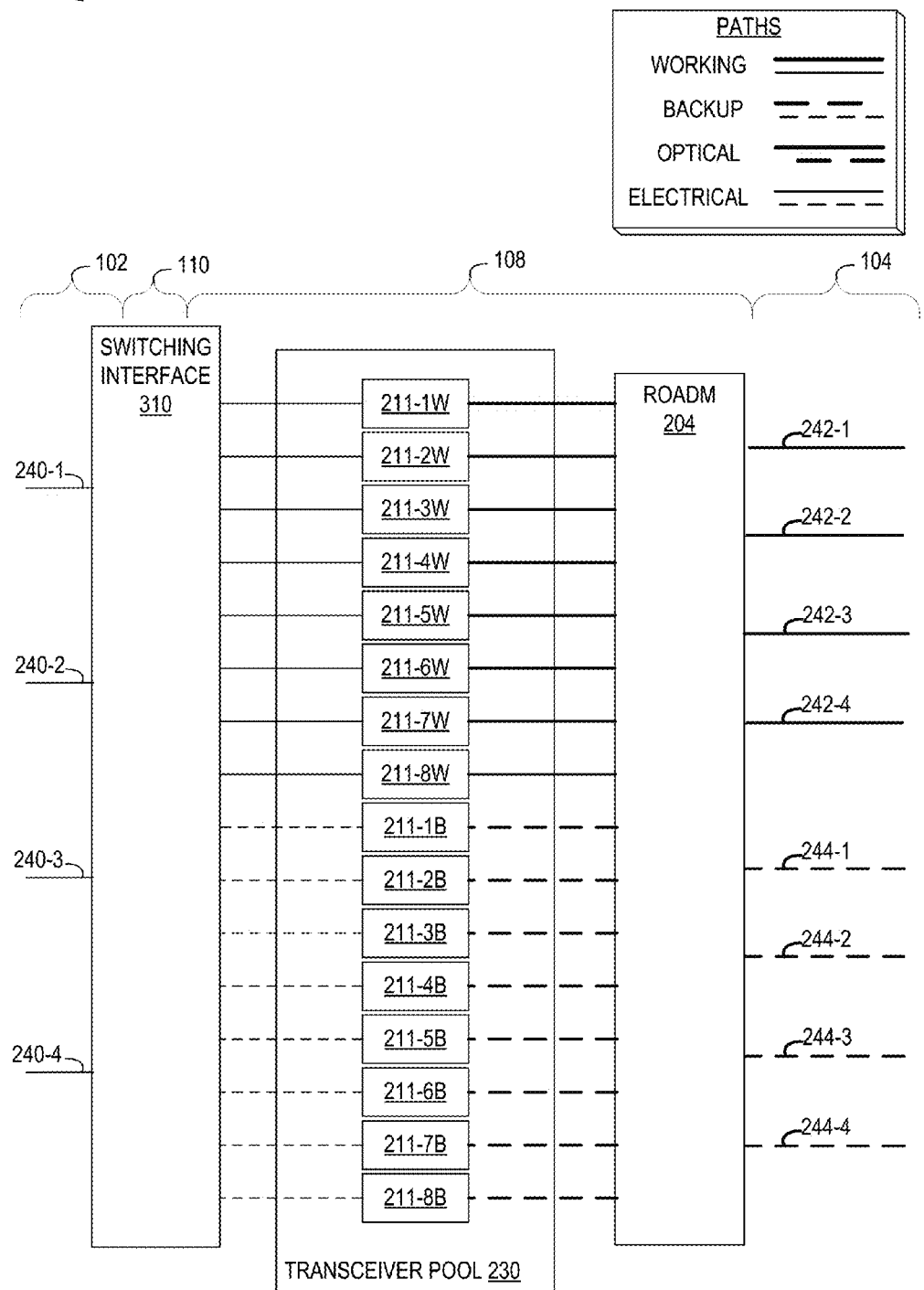
FIG. 3B is a block diagram of selected elements of an embodiment of transceiver sharing using a transceiver pool without working reuse.
Figure 3C:
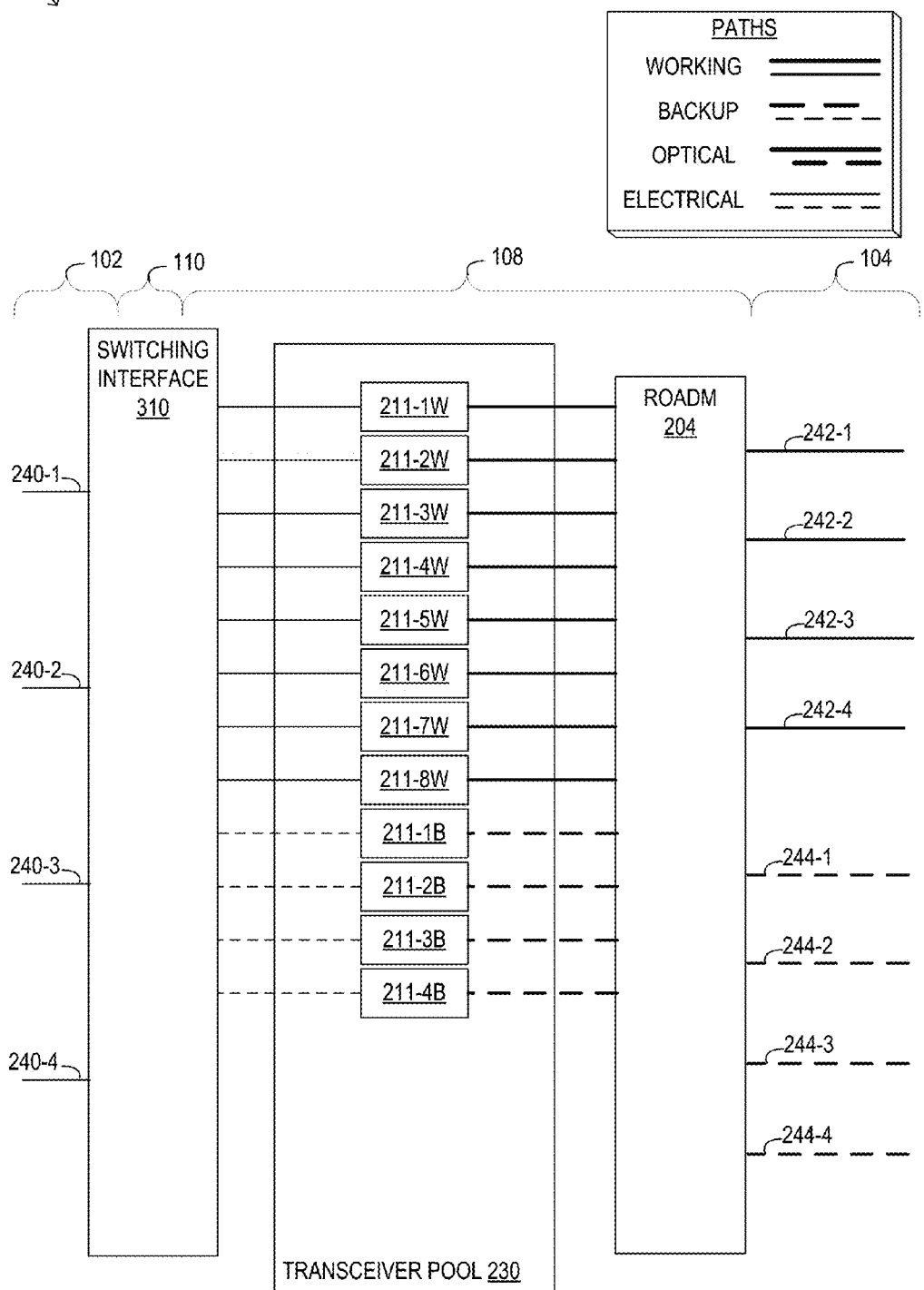
FIG. 3C is a block diagram of selected elements of an embodiment of transceiver sharing using a transceiver pool with working reuse.

Different shared restoration methods may be adopted in flexible grid optical networks (with distance-adaptive modulation) for the routing and spectrum assignment (RSA) of working and backup optical paths in order to improve spectral utilization. A single shared risk group (SRG) failure in the optical network may be assumed. An example of different SRGs showing different failure risks $r_j$ used in the transceiver sharing examples 300, 301, 302 described below respectively with respect to FIGS. 3A, 3B, and 3C is given in Table 1. In Table 1, risk $r_1$ involves failure of working optical paths 242-1 and 242-2, risk $r_2$ involves failure of working optical paths 242-2 and 242-3, while risk $r_3$ involves failure of working optical path 242-4. The backup optical path may accordingly be selected to be risk-disjoint to the working optical path, such that that the backup optical path does not share any nodes or links with the working optical path. It is noted that the SRG risks used in Table 1 for the examples described below are exemplary and have been selected for descriptive purposes. It will be understood that any number and combination of SRG risks or working optical paths may be used, in different embodiments.

TABLE 1

SRG risks in transceiver sharing examples 300, 301, 302

| RISK | WORK 1 (242-1) | WORK 2 (242-2) | WORK 3 (242-3) | WORK 4 (242-4) |
|---|---|---|---|---|
| $r_1$ | X | X | | |
| $r_2$ | | X | X | |
| $r_3$ | | | | X |

As will be described in further detail, three different restoration procedures for identifying backup optical paths for a given set of working optical paths are presented in FIGS. 3A, 3B, and 3C. The restoration procedures may involve generating (or outputting) a route and spectrum assignment of the working optical paths and the backup optical paths, for example, as associated with a connection request. The route and spectrum assignment may serve as input for the transceiver sharing methods disclosed herein. Based on the input, the working optical paths and the backup optical paths originating and terminating at each ROADM node 108 may be identified. The selection of the backup optical paths and degree of transceiver sharing at ROADM node 108 may depend upon various components used in ROADM node 108.

Furthermore, a conflict set, $B_e^{r_j}$ is introduced that may define a set of backup optical paths 244 that originate and end at ROADM node e and for which transceivers may be assigned for a SRG risk $r_j$ failure. A backup optical path 244 may be assigned a transceiver when a working optical path 242 associated with the backup optical path 244 fails. A conflict subset, $B_{e,k}^{r_j}$ may further be defined as a subset of the conflict set $B_e^{r_j}$, which includes backup optical paths 244 using k transceivers at ROADM node e for a failure associated with risk $r_j$. Using the output from the RSA procedure, the conflict subsets at each ROADM node 108 may be determined.

Referring now to FIGS. 3A, 3B, and 3C, selected elements of embodiments of transceiver sharing for efficient utilization of transceivers for shared restoration are shown. In FIGS. 3A, 3B, and 3C, a working optical path $Work_i(\{r_j\})$ may represent an ith working optical path with a set of risks $\{r_j\}$. For each working optical path 242-$i$ ($Work_i$), a corresponding backup optical path 244-$i$ ($Backup_i$) may be defined. In the embodiments depicted in FIGS. 3A, 3B, and 3C, the optical paths may be assumed to be 400 Gb/s. The working optical paths 242, as well as backup optical path 244-3 and backup optical path 244-4 are assumed to use a DP-16QAM modulation format with 2 transceivers (k=2). Backup optical path 244-1 and backup optical path 244-2 are assumed to use DP-QPSK modulation format with 4 transceivers (k=4).

In FIG. 3A, selected elements of an embodiment of transceiver sharing 301 at a conventional ROADM with dedicated transponders (see FIG. 2A) is illustrated. In transceiver sharing 301, working optical path 242-1 uses transponder 206-1W, working optical path 242-2 uses transponder 206-2W, working optical path 242-3 uses transponder 206-3W, and working optical path 242-4 uses transponder 206-4W. In the case of risk $r_1$ failure in transceiver sharing 301, backup optical path 244-1 may use transponder 208-1B and backup optical path 244-2 may use transponder 208-2B, which are connected using ROADM 204. In the case of risk $r_2$ failure in transceiver sharing 301, backup optical path 244-2 may use transponder 208-1B. Since each transponder 206, 208 in FIG. 3A has a fixed modulation format, transponder 208 having DP-QPSK format may not be used for DP-16QAM format, so transponder 206-1B is used for assignment to backup optical path 244-3, corresponding to DP-16QAM. In the case of risk $r_3$ failure in transceiver sharing 301, transponder 206-1B may be reused for backup optical path 244-4. Accordingly, in transceiver sharing 301, backup optical path 244-3 and backup optical path 244-4 may share transponder 206-1B, since backup optical path 244-3 and backup optical path 244-4 use the same type of transponder 206 (DP-16QAM) and are associated with risk-disjoint working optical paths.

A number of backup transceivers at ROADM node 108 (ROADM e) with dedicated transponders may be a maximum number of transceivers 210 at transponders 206 (k=2) for a risk failure plus a maximum number of transceivers 210 at transponders 208 (k=4) for a risk failure. Thus, the total number of backup transceivers at ROADM e for dedicated transponders, as shown in transceiver sharing 301 of FIG. 3A, may be given by Expression 1.

$$\Sigma_k \text{Max}_{\forall r_j}(|B_{e,k}^{r_j}| \times k), k=2,4 \qquad \text{Expression (1)}$$

Based on Expression (1), the total number of backup transceivers used at ROADM node 108 in FIG. 3A is $(1\times2)+(2\times4)=10$.

In FIG. 3B, selected elements of an embodiment of transceiver sharing 302 using a transceiver pool 230 based on ROADM node architecture 200-2 of FIG. 2B are illustrated. In FIG. 3B, working transceivers 211-1W, 211-2W, 211-3W, 211-4W, 211-5W, 211-6W, 211-7W, 211-8W may not be reused as backup transceivers after a failure occurs. In the case of risk $r_1$ failure in transceiver sharing 302, backup optical path 244-1 and backup optical path 244-2 may use a total of 8 backup transceivers (211-1B, 211-2B, 211-3B, 211-4B, 211-5B, 211-6B, 211-7B, 211-8B). In the case of $r_2$ failure in transceiver sharing 302, 4 backup transceivers (e.g., 211-1B, 211-2B, 211-3B, 211-4B) pool may be reused for backup optical path 244-2 and 2 backup transceivers (e.g., 211-5B, 211-6B) may be reused for backup optical path 244-3. In the case of $r_3$ failure in transceiver sharing 302, 2 backup transceivers may be reused for backup optical path 244-4 (e.g., 211-1B, 211-2B). Because of the flexible availability of transceivers 211 in transceiver pool 230, different assignments of transceivers 211 may be used in different embodiments. It is noted that transceiver pool 230 in transceiver sharing 302 in FIG. 3B improves the sharing of backup transceivers among backup optical paths and provides further savings, as compared with transceiver sharing 301 in FIG. 3A.

A total number of backup transceivers for ROADM node 108 (ROADM e) having transceiver pool 230 is the maximum number of transceivers used for a risk failure. Hence, a total number of backup transceivers at ROADM e for transceiver pool 230 in transceiver sharing 302, as shown in FIG. 3B, may be given by Expression 2.

$$\text{Max}_{\forall r_j}\left(\sum_k (|B_{e,k}^{r_j}| \times k)\right), k = 2, 4 \qquad \text{Expression (2)}$$

Based on Expression 2, the total number of backup transceivers used at ROADM node 108 in transceiver sharing 302 in FIG. 3B is 8.

In FIG. 3C, selected elements of an embodiment of transceiver sharing 303 using a transceiver pool 230 based on ROADM node architecture 200-2 of FIG. 2B are illustrated. In FIG. 3C, further savings of backup transceivers may be achieved by reusing transceivers from failed working optical paths 242, taking advantage of transceiver pool 230 in in transceiver sharing 303. Transceivers 211 from failed working optical paths may be reused because the failure may be assumed to be elsewhere in optical network 106.

In the case of risk $r_1$ failure in transceiver sharing 303, backup optical path 244-1 and backup optical path 244-2 may use a total of 4 backup transceivers (211-1B, 211-2B, 211-3B, 211-4B) as well as 4 working transceivers (e.g., 211-1W, 211-2W, 211-3W, 211-4W). In the case of $r_2$ failure in transceiver sharing 303, 4 backup transceivers (e.g., 211-1B, 211-2B, 211-3B, 211-4B) pool may be reused for backup optical path 244-2 and 2 working transceivers (e.g., 211-5W, 211-6W) may be reused for backup optical path 244-3. In the case of $r_3$ failure in transceiver sharing 303, 2 backup transceivers may be reused for backup optical path 244-4 (e.g., 211-1B, 211-2B). Because of the flexible availability of transceivers 211 in transceiver pool 230, different assignments of transceivers 211 may be used in different embodiments. It is noted that transceiver pool 230 in transceiver sharing 303 in FIG. 3C improves the sharing of transceivers among backup optical paths and provides further savings, as compared with transceiver sharing 302 in FIG. 3B.

A total number of backup transceivers in ROADM node 108 (ROADM e) having transceiver pool 230 and with working transceiver reuse, as shown in transceiver sharing 303 in FIG. 3C, may be a maximum number of backup transceivers, in addition to the transceivers from the failed working optical paths, for a risk failure. Let $W_{e,k}^{r_j}$ be a set of working optical paths that fail when a risk $r_j$ occurs and may be assigned k transceivers. Hence, a number of backup transceivers at ROADM e, as shown in transceiver sharing 303 in FIG. 3C, may be given by Expression 3.

$$\text{Max}_{\forall r_j}(\Sigma_k(|B_{e,k}^{r_j}|\times k) - \Sigma_k(|W_{e,k}^{r_j}|\times k)), k=2,4 \qquad \text{Expression (3)}$$

Based on Expression 3, a total number of backup transceivers at ROADM node 108 in transceiver sharing 303 in FIG. 3C is 4. It is noted that, when all working optical paths 242 and backup optical paths 244 have the same modulation format and use the same number of transceivers, all working transceivers may be reused as backup transceivers without adding any additional backup transceivers.

Operational complexity and restoration delay associated with shared restoration in flexible grid optical networks may primarily relate to switching to selected transceivers, ROADM switching, and transceiver tuning to an assigned spectrum for the respective case presented with regard to FIGS. 3A, 3B, and 3C. Although the dedicated transponder in FIG. 3A may be simpler to manage due to the use of fixed format transponder cards, a similar restoration delay may be expected for each of the respective cases presented in FIGS. 3A, 3B, and 3C, since the restoration delay may be dominated by transceiver tuning time.

Figure 4A:
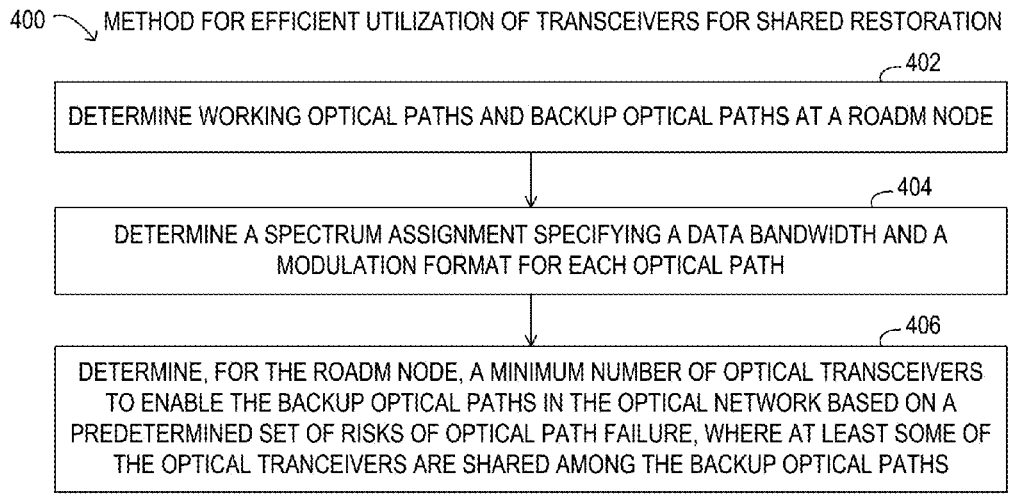
FIG. 4A is a flow chart depicting selected elements of an embodiment of a method for efficient utilization of transceivers for shared restoration.

Referring now to FIG. 4A, selected elements of an embodiment of method 400 for implementing efficient utilization of transceivers for shared restoration, as described herein, is shown in flow chart format. In various embodiments, method 400 may be implemented using backup transceiver manager 530 (see FIG. 5). It is noted that certain operations depicted in method 400 may be rearranged or omitted, as desired.

Method 400 may begin by determining (operation 402) working optical paths and backup optical paths at a ROADM node. A spectrum assignment is determined (operation 404) specifying a data bandwidth and a modulation format for each optical path. Then, for the ROADM node, a minimum number of optical transceivers are determined (operation 406) to enable the backup optical paths in the optical network based on a predetermined set of risks of optical path failure, where at least some of the optical transceivers are shared among the backup optical paths.

Figure 4B:
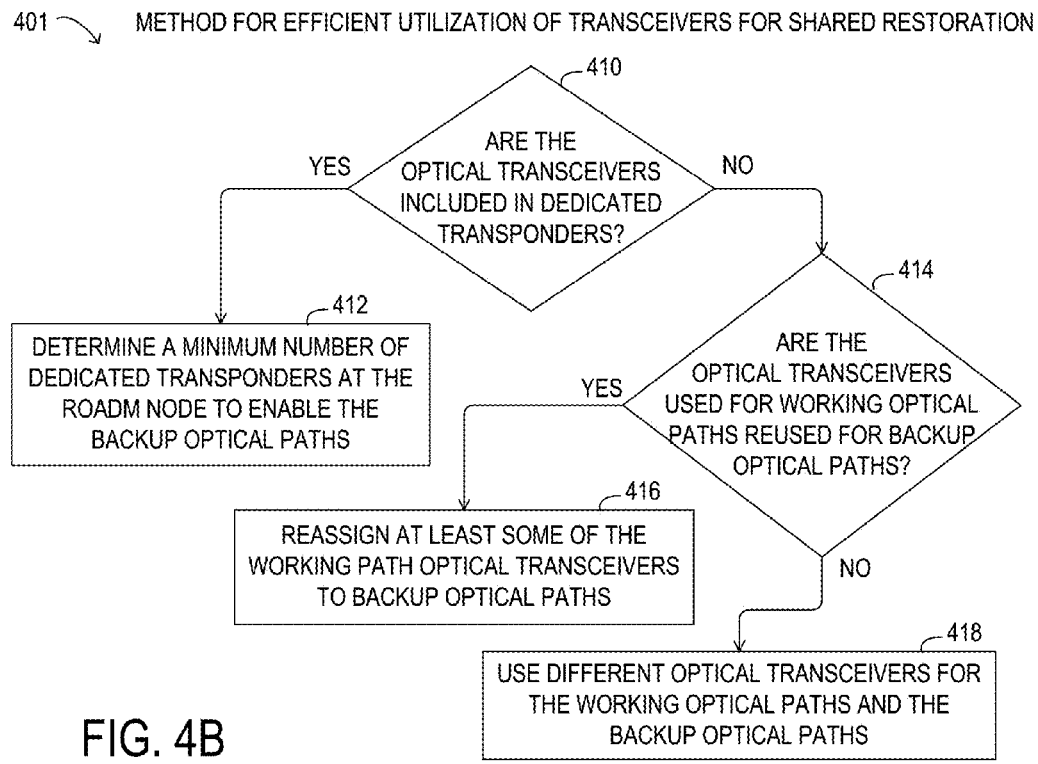
FIG. 4B is a flow chart depicting selected elements of an embodiment of a method for efficient utilization of transceivers for shared restoration.

Referring now to FIG. 4B, selected elements of an embodiment of method 401 for implementing efficient utilization of transceivers for shared restoration, as described herein, is shown in flow chart format. Method 401 may represent at least a portion of operation 404 in method 400 (see FIG. 4A). In various embodiments, method 401 may be implemented using backup transceiver manager 530 (see FIG. 5). It is noted that certain operations depicted in method 401 may be rearranged or omitted, as desired.

Method 401 may begin by with a decision whether the optical transceivers are included (operation 410) in dedicated transponders. When the optical transceivers are included in dedicated transponders, the result of operation 410 is YES, and a minimum number of dedicated transponders may be determined (operation 412) at the ROADM node to enable the backup optical paths. When the optical transceivers are not included in dedicated transponders, the result of operation 410 is NO, and a further decision may be made whether the optical transceivers used for working optical paths are reused (operation 414) for backup optical paths. When the optical transceivers used for working optical paths are not reused, the result of operation 414 is NO, and different optical transceivers are used (operation 418) for the working optical paths and the backup optical paths. When the optical transceivers used for working optical paths are reused, the result of operation 414 is YES, and at least some of the working path optical transceivers are reassigned (operation 416) to backup optical paths.

Figure 5:
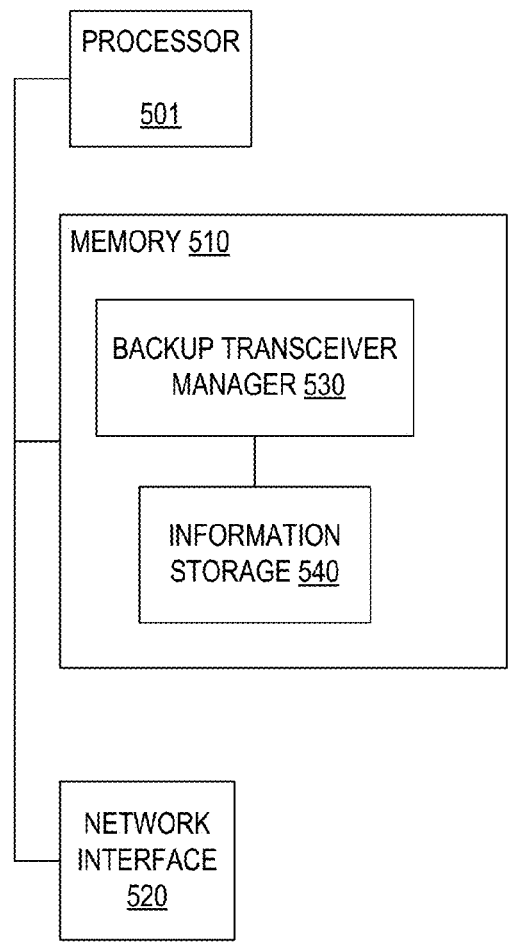
FIG. 5 is a block diagram of selected elements of an embodiment of a management system.

Referring now to FIG. 5, a block diagram of selected elements of an embodiment of management system 500 is illustrated. In FIG. 5, management system 500 is represented as a computer system including physical and logical components for implementing efficient utilization of transceivers for shared restoration, as described herein, and may accordingly include processor 501, memory 510, and network interface 520. Processor 501 may represent one or more individual processing units and may execute program instructions, interpret data, and process data stored by memory 510 or management system 500.

In FIG. 5, memory 510 may be communicatively coupled to processor 501 and may comprise a system, device, or apparatus suitable to retain program instructions and/or data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 510 may include different numbers of physical storage devices, in various embodiments.

As shown in FIG. 5, memory 510 may include backup transceiver manager 530, which may represent respective sets of computer-readable instructions that, when executed by a processor, such as processor 501, may execute various algorithms for efficient utilization of transceivers for shared restoration, including, but not limited to, transceiver sharing 301, 302, 303 and method 400. Information storage 540 may store various data and parameters, such as data and parameters associated with backup transceiver manager 530.

Figure 6:
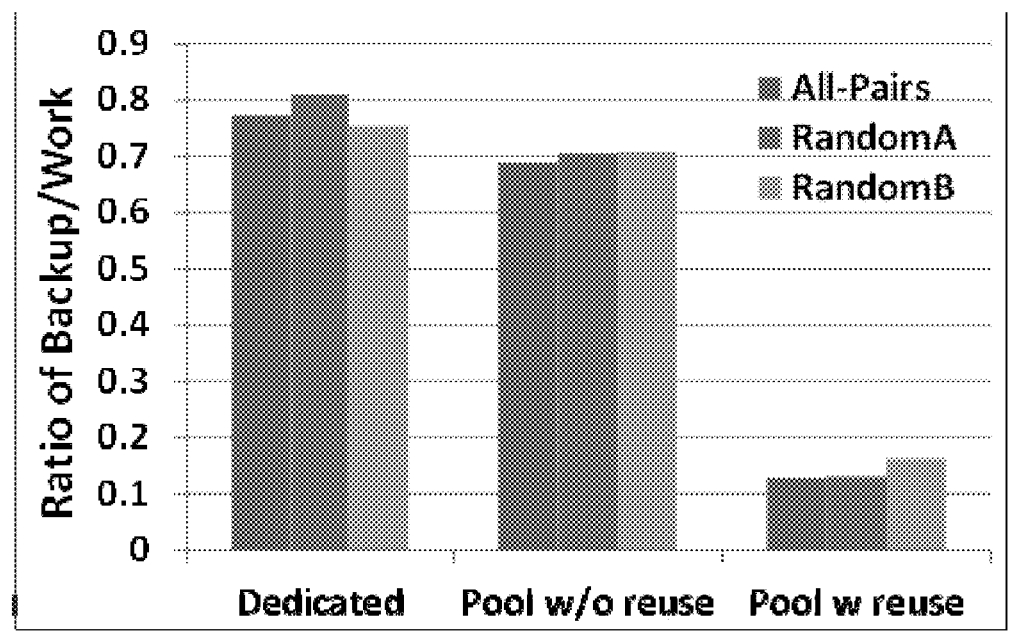
FIG. 6 is a bar graph of selected simulation data of efficient utilization of transceivers for shared restoration.

Turning now to FIG. 6, simulation data comparing a ratio of backup transceivers and working transceivers for the three cases respectively corresponding to FIGS. 3A, 3B, and 3C is presented in bar graph format. The ratio of backup-to-working transceivers may represent a good measure of an overall transceiver utilization in the network, where a lower ratio indicates higher utilization. For the case of a transceiver pool with working transceiver reuse, as in FIG. 3C, a maximum ratio of backup-to-working transceivers was found to reach 16%, which represents a significant reduction from the 68% for the dedicated transponder case, as in FIG. 3A. The lower maximum backup-to-working transceiver ratio may be achieved by taking advantage of the flexibility of sharing transceivers provided by the ROADM architecture shown in FIG. 2B. The additional backup transceivers may be due to the fact that backup optical paths typically have longer physical distance and use DP-QPSK compared to working optical paths that use DP-16QAM. Furthermore, RandomB may use slightly more backup transceivers than other connection request sets due to a higher percentage of connection requests whose backup optical paths use more transceivers than the associated working optical paths. For the transceiver pool without working transceiver reuse, as in FIG. 3B, the ratio of backup-to-working transceivers is around 70% due to flexible transceiver sharing between backup optical paths. For the dedicated transponder case, as in FIG. 3A, the ratio of backup-to-working transceivers is the highest among all 3 cases, around 80%, due to lower sharing capability of different types of backup transponders. In the dedicated transponder case, RandomA has the highest ratio of backup-to-working transceivers, since RandomA has the most balanced DP-16QAM and DP-QPSK backup optical paths (40% for DP-16QAM and 60% for DP-QPSK), which results in fewer sharing possibilities among paths using different types of dedicated transponders.

As disclosed herein, transceiver sharing methods may be based on different ROADM node architectures for shared restoration in flexible grid optical networks. A ROADM node architecture with a pool of transceivers may improve transceiver utilization for backup optical paths, compared to a conventional ROADM node architecture. Sharing of transceivers in the pool for working and backup optical paths may further improve transceiver utilization. The methods disclosed herein may be used for multiple bit rates and different modulation formats.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for efficient utilization of transceivers in optical networks, the method comprising:

determining, for a reconfigurable optical add-drop multiplexer (ROADM) node in an optical network, a plurality of backup optical paths respectively corresponding to a plurality of working optical paths;

determining a respective spectrum assignment for each of the backup optical paths and for each of the working optical paths, wherein the backup optical paths and the working optical paths represent respective pairs of working-backup optical paths having a first end point at the ROADM node, wherein each pair of the working-backup optical paths has a second end point at a common node in the optical network, and wherein a spectrum assignment specifies a data bandwidth and a modulation format for an optical path; and determining, for the ROADM node, a minimum number of optical transceivers to enable the backup optical paths in the optical network based on a predetermined set of risks of optical path failure, wherein the optical transceivers are included in dedicated transponders at the ROADM node, wherein a dedicated transponder includes at least two optical transceivers that operate with a spectrum assignment that is predetermined, and wherein at least some of the optical transceivers are shared among the backup optical paths; and switching, using a switch included in the ROADM node, between a pair of working-backup optical paths.

2. The method of claim 1, wherein the optical transceivers are enabled to transmit and receive a superchannel.

3. The method of claim 1, wherein at least some of the pairs of working-backup optical paths have different spectrum assignments for a working optical path and a backup optical path included in a pair of working-backup optical paths.

4. The method of claim 1, wherein each backup optical path is risk-disjoint to its corresponding working optical path.

5. A method for efficient utilization of transceivers in optical networks, the method comprising:

determining, for a reconfigurable optical add-drop multiplexer (ROADM) node in an optical network, a plurality of backup optical paths respectively corresponding to a plurality of working optical paths;

determining a respective spectrum assignment for each of the backup optical paths and for each of the working optical paths, wherein the backup optical paths and the working optical paths represent respective pairs of working-backup optical paths having a first end point at the ROADM node, wherein each pair of the working-backup optical paths has a second end point at a common node in the optical network, and wherein a spectrum assignment specifies a data bandwidth and a modulation format for an optical path; and determining, for the ROADM node, a minimum number of optical transceivers to enable the backup optical paths in the optical network based on a predetermined set of risks of optical path failure, wherein the optical transceivers are included in a transceiver pool at the ROADM node, wherein each of the optical transceivers is a universal transceiver enabled to support different spectrum assignments, and wherein at least some of the optical transceivers are shared among the backup optical paths; and switching, using a cross-connect switch included in the ROADM node, to enable selection of a first optical transceiver for one of a working optical path and a backup optical path.

6. The method of claim 5, wherein the optical transceivers associated with the working optical paths are not used for the backup optical paths.

7. The method of claim 5, wherein at least some of the optical transceivers associated with the working optical paths are used for the backup optical paths.

8. The method of claim 5, wherein each backup optical path is risk-disjoint to its corresponding working optical path.

9. An article of manufacture, comprising:
a non-transitory, computer-readable medium; and
computer executable instructions stored on the computer-readable medium, the instructions readable by a processor and, when executed, for causing the processor to:
determine, for a reconfigurable optical add-drop multiplexer (ROADM) node in an optical network, a plurality of backup optical paths respectively corresponding to a plurality of working optical paths,
determine a respective spectrum assignment for each of the backup optical paths and for each of the working optical paths, wherein the backup optical paths and the working optical paths represent respective pairs of working-backup optical paths having a first end point at the ROADM node, wherein each pair of the working-backup optical paths has a second end point at a common node in the optical network, and wherein a spectrum assignment specifies a data bandwidth and a modulation format for an optical path, and
determine, for the ROADM node, a minimum number of optical transceivers to enable the backup optical paths in the optical network based on a predetermined set of risks of optical path failure, wherein the optical transceivers are included in dedicated transponders at the ROADM node, wherein a dedicated transponder includes at least two optical transceivers that operate with a spectrum assignment that is predetermined, and wherein at least some of the optical transceivers are shared among the backup optical paths, and
switch, using a switch included in the ROADM node, between a pair of working-backup optical paths.

10. The article of manufacture of claim 9, wherein the optical transceivers are enabled to transmit and receive an optical superchannel.

11. The article of manufacture of claim 9, wherein at least some of the pairs of working-backup optical paths have different spectrum assignments for a working optical path and a backup optical path included in a pair of working-backup optical paths.

12. The article of manufacture of claim 9, wherein each backup optical path is risk-disjoint to its corresponding working optical path.

13. An article of manufacture, comprising:
a non-transitory, computer-readable medium; and
computer executable instructions stored on the computer-readable medium, the instructions readable by a processor and, when executed, for causing the processor to:
determine, for a reconfigurable optical add-drop multiplexer (ROADM) node in an optical network, a plurality of backup optical paths respectively corresponding to a plurality of working optical paths,
determine a respective spectrum assignment for each of the backup optical paths and for each of the working optical paths, wherein the backup optical paths and the working optical paths represent respective pairs of working-backup optical paths having a first end point at the ROADM node, wherein each pair of the working-backup optical paths has a second end point at a common node in the optical network, and wherein a spectrum assignment specifies a data bandwidth and a modulation format for an optical path, and
determine, for the ROADM node, a minimum number of optical transceivers to enable the backup optical paths in the optical network based on a predetermined set of risks of optical path failure, wherein the optical transceivers are included in a transceiver pool at the ROADM node, wherein each of the optical transceivers is a universal transceiver enabled to support different spectrum assignments, and wherein at least some of the optical transceivers are shared among the backup optical paths, and
switch, using a cross-connect switch included in the ROADM, to enable selection of a first optical transceiver for one of a working optical path and a backup optical path.

14. The article of manufacture of claim 13, wherein the optical transceivers associated with the working optical paths are not used for the backup optical paths.

15. The article of manufacture of claim 13, wherein at least some of the optical transceivers associated with the working optical paths are used for the backup optical paths.

16. The article of manufacture of claim 13, wherein each backup optical path is risk-disjoint to its corresponding working optical path.

* * * * *